Oct. 5, 1937.  W. E. METHVIN  2,094,955
SAFETY DEVICE FOR AIRCRAFT
Filed March 6, 1934  2 Sheets-Sheet 1
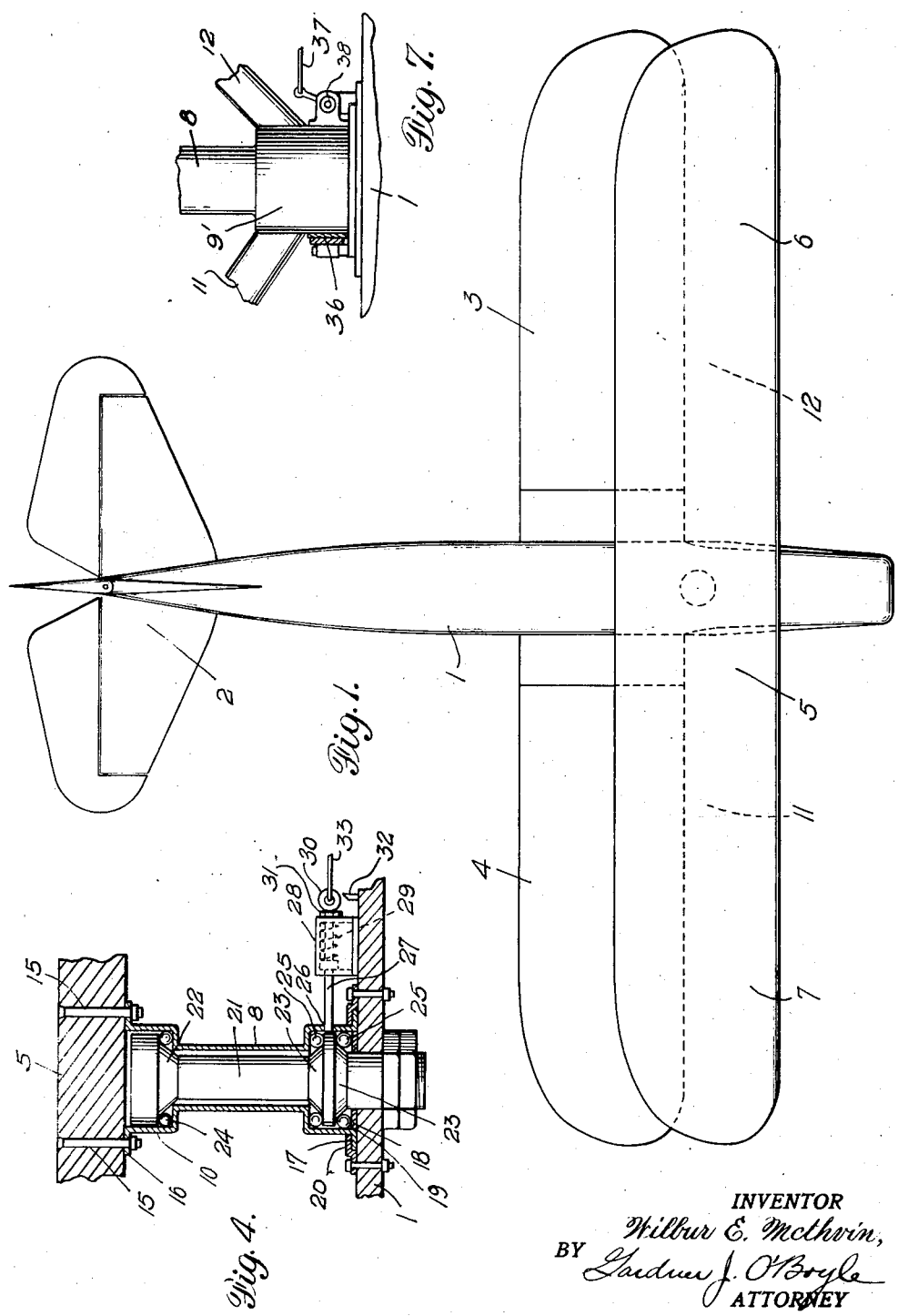
INVENTOR
Wilbur E. Methvin,
BY Gardner J. O'Boyle
ATTORNEY Oct. 5, 1937.   W. E. METHVIN   2,094,955
SAFETY DEVICE FOR AIRCRAFT
Filed March 6, 1934   2 Sheets-Sheet 2
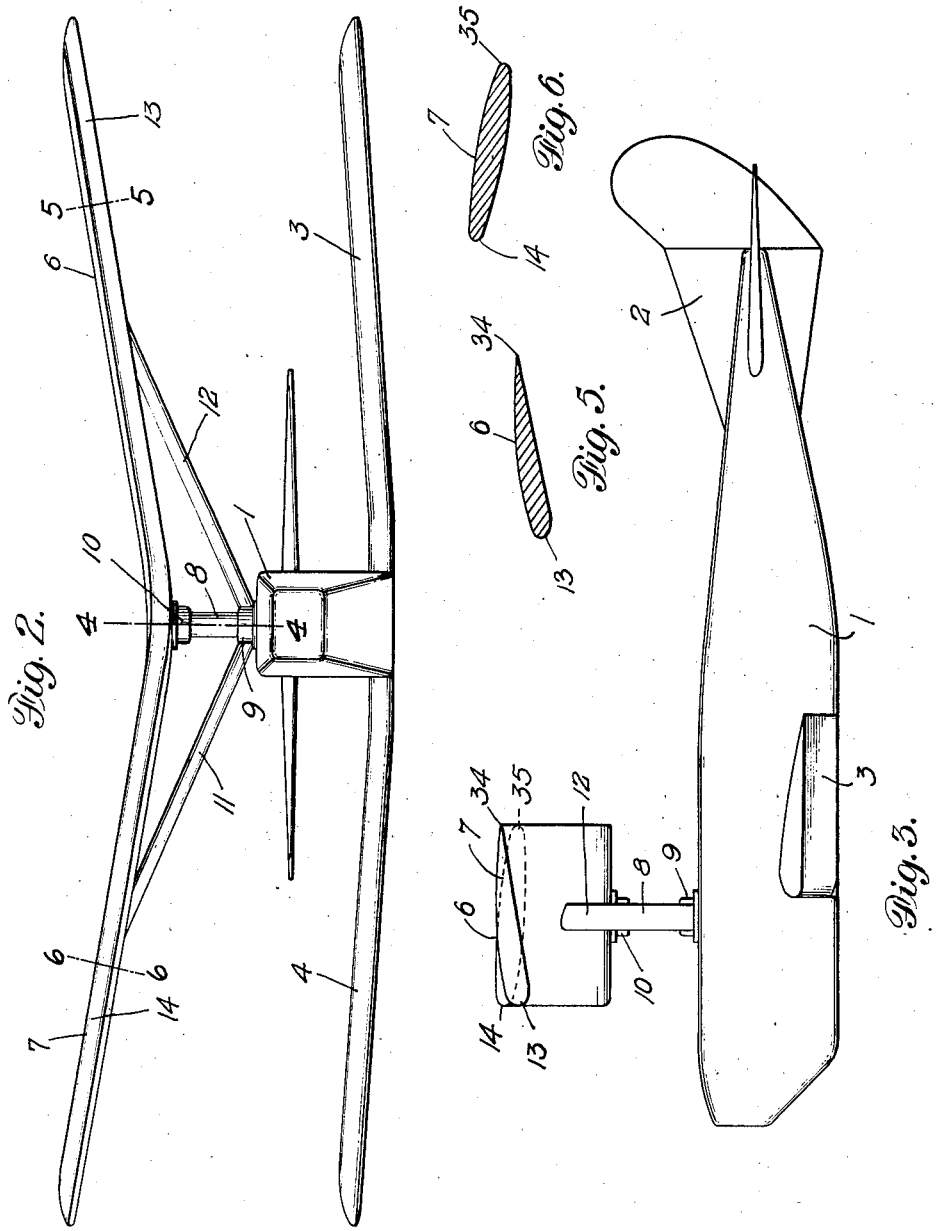
INVENTOR
Wilbur E. Methvin,
BY Gardner J. O'Boyle
ATTORNEY Patented Oct. 5, 1937

2,094,955

UNITED STATES PATENT OFFICE 2,094,955

SAFETY DEVICE FOR AIRCRAFT

Wilbur E. Methvin, Lawrenceburg, Tenn.

Application March 6, 1934, Serial No. 714,310

10 Claims. (Cl. 244—7)

My invention relates to aircraft and more particularly to an improved safety device for airplanes.

Heretofore, it has been suggested to equip airplanes with safety devices, in the form of an auxiliary propeller adapted when released for rotation, to retard or check the descent of an airplane, in the event that the airplane becomes disabled so that sustained flight can not be maintained. In the prior art devices, the rotating member is sometimes mounted for free rotation and it has also been proposed to drive the member directly, by connecting it to the aircraft prime mover or an auxiliary motor.

If the rotatable propeller is mounted exterior of the wing surfaces and remains in this position during the normal operation of the aircraft, considerable drag is created, which materially reduces the efficiency of the airplane. To overcome this objection, it has been suggested to provide the upper wing with a recess adapted to receive the auxiliary propeller during normal flight and means are provided whereby the propeller may be moved into the operative position.

The last mentioned arrangement, while reducing the drag, is open to the objection that it is too complicated, since it requires the operation of a series of mechanisms before the safety device will function. It will be appreciated that any device of this character, designed to increase the factor of safety for aircraft, generally, must of necessity be constructed and arranged so that it will operate automatically, instantaneously, and with minimum movement of parts, otherwise it fails to meet the inherent requirements for a practical, operative, safety device.

My invention aims to provide for the deficiencies of the prior art arrangements and at the same time overcome certain objections found therein. The improved safety device, of the present invention, comprises generally a construction wherein the upper wing of the aircraft is adapted to be released for free rotation about a central supporting shaft, in event that the airplane becomes damaged or disabled. The rotatable wing is designed to function as a conventional airfoil during normal flight and operates to prevent sudden descent of the airplane, when it is released for free rotation.

An object of my invention is to provide an improved safety device for aircraft wherein one of the normally stationary airfoils is adapted for free rotation.

Another object of my invention is to provide an aircraft having an airfoil adapted to function as a conventional wing member for the airplane and also as a safety device if the airplane is disabled.

Yet another object of my invention is to provide a safety device for airplanes constructed and arranged so that it will operate automatically and instantaneously.

Still another object of my invention is to provide a safety device for aircraft wherein the rotatable wing is designed to freely rotate without the aid of any mechanical drive means.

A further object of my invention is to provide a safety device for aircraft, having an improved wing structure whereby the freely rotatable member rotates in a predetermined direction.

A still further object of my invention is to provide a safety device for aircraft which is strong and sturdy in construction, consisting of but few parts and one that is not liable to get out of order even after long and continued use.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 1 is a plan view of an airplane provided with my improved safety device.

Fig. 2 is a front elevational view of the arrangement shown in Figure 1.

Fig. 3 is a side elevational view of the aircraft shown in Figure 1.

Fig. 4 is a sectional view along line 4—4 of Figure 2, showing the mounting for the rotatable wing.

Fig. 5 is a sectional view along line 5—5 of Figure 2.

Fig. 6 is a sectional view along line 6—6 of Figure 2; and

Fig. 7 is a modification of the releasing device shown in Figure 4.

Referring to the drawings and more particularly to Figures 1 to 3, there is shown an airplane comprising a fuselage I, provided with an empennage, designated generally by numeral 2. Extending outwardly from the sides of the fuselage are two airfoils 3 and 4 forming a fixed wing for the aircraft, and above this wing there is mounted a wing 5 comprising airfoil portions 6 and 7. The top wing 5 is rotatably mounted upon the fuselage 1 through the medium of a suitable hanger comprising a support member 8 provided with hub portions 9 and 10. The airfoils 6 and 7 are tilted upwardly from a dihedral angle and they are supported in this position by means of struts 11 and 12, the struts being attached to the underside of the wing and terminating in the hub portion 9.

It will be noted that the wing member 5 is mounted forwardly of the lower fixed wing and that the leading edge 13 of portion 6 is lower than the leading edge 14 of portion 7. The purpose of this arrangement is to insure positive rotation of the wing as soon as it is released for free rotation about its supporting member 8, as will be described more fully hereinafter.

Referring to Figure 3, I have shown one form of mounting and release mechanism, whereby the upper wing 5 is permitted to freely rotate about its support. The wing is securely attached to hub portion 10 of support member 8 by suitable fastening means 15, adapted to pass through the flanged portion 16 of the hub and the lower end of the tubular support 8 is formed with a flanged portion 17, adapted to rest upon a bearing plate 18 which seats in a recess 19 formed in the fuselage. A suitable cover plate 20 is provided for the purpose of preventing passage of dirt or other foreign matter to the bearing surfaces. Within the tubular member 8, there is mounted a stationary shaft 21 embedded in the fuselage and formed with ball races 22 and 23 near the top and bottom thereof, the races being adapted to accommodate a plurality of ball bearings 24 and 25.

It will be seen that when wing 5 rotates, it turns member 8 with it and that the upward and downward thrusts exerted upon the member are taken up by the ball bearings at the top and bottom of the stationary shaft. In order to lock member 8 against rotation, the lower hub portion 9 is recessed as at 26 and adapted to receive the end of a spring pressed plunger 27 supported in a suitable housing 28 through which it extends, the plunger passing through a spring 29 and terminating in a hand grip member 30. Between the end of the housing 28 and grip member 29, there is provided a projection or key 31 arranged to cooperate with a stop 32 and hold the plunger in the retracted position. A cable 33 attached to grip 34 may be used for remote control of the releasing device.

In the operation of the device, wing 5 is normally stationary and assumes the position shown in Figure 1. If the aircraft should become damaged or disabled, the end of plunger 27 is released from the recess 26 formed in the hub portion 9, thereby permitting tubular member 8 together with wing 5 to freely rotate. As the plunger is pulled backwardly, projection 31 rides over stop 32, the stop holding the plunger in the retracted position. Since the top wing is mounted forwardly of the bottom or fixed wing, the lower wing does not interfere with the free passage of the air in event that the airplane tends to fall vertically. When the top wing rotates, considerable lift is exerted and the airplane is permitted to descend gently and without any danger of overturning or spinning.

Referring to Figures 5 and 6, it will be noted that airfoil portion 6 is tilted downwardly so that the leading edge 13 is below the horizontal, the section as shown being provided with a blunt leading edge and a thin trailing edge 34. Airfoil 7 is also tilted, but in the opposite direction to portion 6, with its leading edge 14 above the horizontal, the section being formed with a double camber having a blunt trailing edge 35. The construction and arrangement of the airfoil sections forming the rotatable wing 5, is designed to make one side of the wing more readily stallable than the other side. At large angles of attack, one side of the wing will have a larger drag than the other side, whereby spinning of the wing is effected when it is released for free rotation.

While the arrangement disclosed herein has been referred to as a safety device adapted to be used in event that the airplane becomes disabled, the invention in its broadest aspect comprehends normal use in connection with an airplane which is not disabled. That is, the rotatable wing may be released for free rotation before the plane leaves the ground, in order to obtain the benefit of the increased lift, produced by the novel design of the rotating wing structure. After the aircraft has reached the desired altitude, the wing may be braked and held in the position shown in Figure 1. It has been found, as a result of extensive tests, that when the airplane is levelled off, the rotating wing automatically assumes a position with its leading edge parallel to the leading edge of the fixed wing. It is possible, therefore, to use the device without any locking or release means. As long as the airplane continues in substantially horizontal flight, the wing remains stationary, however, if the angularity of the plane is changed, the wing begins to rotate.

For the purpose of locking the rotatable wing in a fixed position, if it is found desirable to do so, I have provided a braking arrangement shown in Figure 7. The hub portion 9' is extended to accommodate the lower ends of the struts 11 and 12 and the lower portion thereof is adapted to receive a band 36 which is arranged to be clamped into frictional engagement with the hub by means of a lever 37 and associated mechanism 38. The contact surfaces may be formed with a suitable lining whereby effective braking of the member 8 is obtained.

It will now be appreciated that I have provided a wing with two types of wing sections, so arranged as to increase the starting torque around its yaw axis. The wing is free to rotate about its axis and the provision of differently pitched extensions gives the usual equal or normal lift and drag at small angles of attack, but a different lift or drag for corresponding sides so as to produce additional torque for auto rotation of the entire wing. By means of the present arrangement, an airfoil which comprises the main aerodynamic sustenation surface, may be used as a safety device, since it is designed for free rotation during flight.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

What is claimed is:

1. In an airplane, a freely rotatable wing member comprising two airfoils fixedly mounted on the opposite sides of the axis of rotation, one of said airfoils having a positive angle of incidence, the other of said airfoils having a negative angle of incidence.

2. In an airplane, a freely rotatable wing member comprising two airfoils fixedly mounted on the opposite sides of the axis of rotation, one of said airfoils having a positive angle of incidence, the other of said airfoils having a negative angle of incidence, both of said airfoils being tilted upwardly to form a dihedral angle.

3. An airplane wing formed of two airfoils fixedly mounted on opposite sides of the axis of rotation, one of said airfoils having a positive angle of incidence, and provided with a blunt trailing edge, the other of said airfoils having a negative angle of incidence, and provided with a sharp trailing edge.

4. An airplane wing formed of two airfoils fixedly mounted on the opposite sides of the axis of rotation, one of said airfoils having a positive angle of incidence and provided with a blunt trailing edge, the other of said airfoils having a negative angle of incidence and provided with a sharp trailing edge, both of said airfoils being double cambered and tilted upwardly to form a dihedral angle.

5. In an airplane, a freely rotatable wing which comprises the main aero-dynamic sustenation surface, said wing comprising two airfoils fixedly mounted on opposite sides of the axis of rotation, one of said airfoils having a positive angle of incidence, the other of said airfoils having a negative angle of incidence, and means to release said airfoil for free rotation during flight.

6. In an airplane, a plurality of airfoils which comprise the main aero-dynamic sustenation surfaces, one of said airfoils being adapted for rotation and comprising two wing members fixedly mounted on opposite sides of the axis of rotation, one of said wing members having a positive angle of incidence, the other of said wing members having a negative angle of incidence and means to release the rotatable airfoil for free rotation during flight.

7. In an airplane, two airfoils which comprise the main aero-dynamic sustenation surfaces, one of said airfoils being adapted for rotation, comprising two wing members fixedly mounted on opposite sides of the axis of rotation, one of said airfoils having a positive angle of incidence and provided with a blunt trailing edge, the other of said airfoils having a negative angle of incidence and provided with a sharp trailing edge and means to release the rotatable airfoil for free rotation during flight.

8. In an airplane, two airfoils which comprise the main aero-dynamic sustenation surfaces, one of said airfoils being mounted forwardly of the other and adapted for rotation, said airfoil comprising two wing members fixedly mounted on opposite sides of the axis of rotation, one of said airfoils having a positive angle of incidence, the other of said airfoils having a negative angle of incidence and means to release the rotatable airfoil for free rotation during flight.

9. In combination with an airplane having a fixed wing, a safety device comprising a freely rotatable airfoil which normally comprises one of the main aero-dynamic sustenation surfaces, said airfoil being mounted forwardly and above the fixed wing and comprising two wing members fixedly mounted on opposite sides of the axis of rotation, one of said wing members having a positive angle of incidence, the other of said wings having a negative angle of incidence and means to release said airfoil for free rotation during flight.

10. In combination with an airplane having a fixed wing, a safety device comprising a freely rotatable airfoil which normally comprises one of the aero-dynamic sustenation surfaces, mounted forwardly and above the fixed wing, said airfoil comprising two wing members fixedly mounted on opposite sides of the axis of rotation, one of said wing members having a positive angle of incidence and provided with a blunt trailing edge, the other of said wing members having a negative angle of incidence and provided with a sharp trailing edge and means to release said airfoil for free rotation during flight.

WILBUR E. METHVIN.